(12) United States Patent
Van Paridon et al.

(10) Patent No.: US 9,255,349 B2
(45) Date of Patent: Feb. 9, 2016

(54) TERPOLYMER FOR MELT BLOWN MEDIA FOR AIR FILTRATION

(75) Inventors: Henk Van Paridon, Averbode (BE); Antti Tynys, Linz (AT); Joachim Fiebig, St. Marien (AT); Matthew Parkinson, Linz (AT)

(73) Assignee: Borealis AG, Vienna (AT)

( * ) Notice: Subject to any disclaimer, the term of this patent is extended or adjusted under 35 U.S.C. 154(b) by 182 days.

(21) Appl. No.: 13/981,407

(22) PCT Filed: Jan. 9, 2012

(86) PCT No.: PCT/EP2012/050206
§ 371 (c)(1),
(2), (4) Date: Aug. 29, 2013

(87) PCT Pub. No.: WO2012/100974
PCT Pub. Date: Aug. 2, 2012

(65) Prior Publication Data
US 2013/0327006 A1  Dec. 12, 2013

(30) Foreign Application Priority Data

Jan. 28, 2011 (EP) .................................. 11152510

(51) Int. Cl.
| | |
|---|---|
| *D01F 6/06* | (2006.01) |
| *D01D 5/098* | (2006.01) |
| *D01F 6/30* | (2006.01) |
| *D04H 1/4382* | (2012.01) |
| *D04H 1/56* | (2006.01) |
| *B01D 39/04* | (2006.01) |

(52) U.S. Cl.
CPC *D01F 6/06* (2013.01); *B01D 39/04* (2013.01); *D01D 5/0985* (2013.01); *D01F 6/30* (2013.01); *D04H 1/4382* (2013.01); *D04H 1/56* (2013.01); *D04H 1/565* (2013.01); *Y10T 428/298* (2015.01); *Y10T 442/68* (2015.04)

(58) Field of Classification Search
CPC ...... B01D 39/04; B01D 39/1623; D01F 6/06; D01D 5/10
USPC .............. 55/527–528; 422/400; 428/219, 401, 428/482; 526/348; 264/517
See application file for complete search history.

(56) References Cited

U.S. PATENT DOCUMENTS

| 4,211,819 | A | 7/1980 | Kunimune et al. |
|---|---|---|---|
| 5,234,879 | A | 8/1993 | Garoff et al. |
| 6,090,730 | A | 7/2000 | Fujiwara et al. |
| 6,646,051 | B1 * | 11/2003 | Demain ........................ 525/191 |
| 2004/0028903 | A1 * | 2/2004 | Richeson ...................... 428/401 |
| 2012/0107630 | A1 * | 5/2012 | Krishnaswamy et al. .... 428/482 |

FOREIGN PATENT DOCUMENTS

| EP | 0887379 A1 | 12/1998 | |
|---|---|---|---|
| EP | 1941997 A1 * | 7/2008 | ............ C08F 297/08 |
| WO | 9212182 A1 | 7/1992 | |
| WO | 9219653 A1 | 11/1992 | |
| WO | 9219658 A1 | 11/1992 | |
| WO | 9933843 A1 | 7/1999 | |
| WO | 2012100974 A1 | 8/2012 | |

OTHER PUBLICATIONS

International Search Report and Written Opinion for International Patent Application No. PCT/EP2012/050206 Filed Jan. 9, 2012.

* cited by examiner

*Primary Examiner* — Jason M Greene
*Assistant Examiner* — Karla Hawkins
(74) *Attorney, Agent, or Firm* — Warn Partners, P.C.

(57) ABSTRACT

Melt-blown fiber comprising a terpolymer of propylene, ethylene and a $C_4$ to $C_{10}$ α-olefin, wherein further said melt blown fiber and/or said terpolymer has/have a melt flow rate MFR25 (230° C.) of at least 300 g/10 min, the amount of propylene in said terpolymer is at least 90.0 wt.-%, the weight ratio of ethylene and α-olefin within said terpolymer is 1/100 to below 1/1, and the terpolymer has <2,1> regiodefects of below 0.4 mol.-% 0.10.

17 Claims, No Drawings

TERPOLYMER FOR MELT BLOWN MEDIA FOR AIR FILTRATION

CROSS REFERENCE TO RELATED APPLICATIONS

This application is a National Stage of International Application No. PCT/EP2012/050206, filed Jan. 9, 2012. This application claims priority to European Patent Application No. EP 11152510.1 filed on Jan. 28, 2011. The disclosures of the above applications are incorporated herein by reference.

The present invention is directed to a new melt blown web based on melt blown fibers comprising a terpolymer and to articles, in particular filtration media, made there from.

A melt blown web, being a non-woven structure consisting of melt blown fibers, is typically made in a one-step process in which high-velocity air blows a molten thermoplastic resin from an extruder die tip onto a conveyor or take-up screen to form fine fibered self-bonding web. Although many types of polymers can be employed for melt blown fibers and fabrics, polypropylene is one of the most commonly used polymers. Normally for the manufacture of melt blown fibers and webs very low viscosity polypropylene homopolymers are used. However such polymers suffer from limited mechanical strength. To overcome this problem spunbonded fabrics are produced. The polypropylene fibers of the spunbonded fabrics are much thicker compared to melt blown fibers and thus the overall weight of a spunbonded fabric is much higher compared to a melt blown web. A further characterizing and distinguishing feature of melt blown webs are their excellent water barrier and filtration properties not achievable with spunbonded fabrics.

However even though the conventional melt-blown web is the material of choice for filtration media its filtration efficiency needs to be still improved. The major cost of air filters over their lifetime is the energy cost which is related to pressure drop. An optimal filtration media has high collection efficiency with a minimal pressure drop. Therefore a quality factor (QF) has been introduced. The quality factor (QF) takes into account pressure drop as well as collection efficiency of a certain particle size. It is generally known that in order to improve filtration efficiency, thinner fibers are needed in filtration media. During the production of the melt blown web, the filaments can be attenuated by the air stream as long as they are not crystallised. Therefore, in order to facilitate formation thinner fibres, a polymer resin with optimised rheological and crystallisation behaviour is needed. The pressure drop of melt blown media is determined by average fibre diameter and diameter distribution, as well as web structure (bulkiness, porosity). In addition to polymer properties, the melt blown process parameters are crucial in production of melt blown media with low pressure drop. The focus has been on developing novel polymer resins which can be used in meltblown process to produce filtration media with high particle collection efficiency in combination with low pressure drop, which would result into higher quality factor (QF) values. During melt blown web production, a significant cost is generated by hot air, which is used to attenuate the fibres. Therefore, from melt blown process point of view, it is economical to have a polymer resin, which can be used to achieve same or better final melt blown web properties at lower air volumes.

Thus the object of the present invention is to a provide polymer resin which enables a skilled person to produce a melt blown web with improved filtration efficiency. A further object is that an economical manufacture of said melt blown web is achieved, i.e. the melt blown web with improved filtration efficiency is obtained at rather low air volumes.

The finding of the present invention is to provide a melt blown fiber and/or melt blown web based on a terpolmyer with rather low amount of <2,1> regiodefects. Preferably the terpolymer is featured by specific weight ratio between ethylene and one C4 to C20 α-olefin present within the terpolymer, i.e. by a weight ratio of ethylene and one C4 to C20 α-olefin within the terpolymer of at least 1/100 to 1/1.

Thus the present invention is directed to a melt-blown fiber comprising a terpolymer of propylene (C3), ethylene (C2) and a $C_4$ to $C_{10}$ α-olefin (αO), wherein further
(a) said melt blown fiber and/or said terpolymer has/have a melt flow rate $MFR_2$ (230° C.) measured according to ISO 1133 of at least 300 g/10 min,
(b) the amount of propylene (C3) in said terpolymer is at least 90.0 wt.-%,
(c) the weight ratio of ethylene (C2) and $C_4$ to $C_{10}$ α-olefin (αO) [C2/αO] within said terpolymer is 1/100 to below 1/1, and
(d) the terpolymer has <2,1> regiodefects of below 0.4 mol.-% determined by $^{13}C$-spectroscopy.

Surprisingly it has been found out that a melt-blown web made from the inventive melt-blown fibers has a much better quality factor (QF) compared to melt blown webs produced from known melt-blown fibers. Further also the air volume needed during the process can be significantly reduced without loosing the required properties of the melt-blown web (see example section)

In the following the melt-blown fibers according to the instant invention is defined in more detail.

One essential requirement is that the inventive fiber is a melt-blown fiber. Melt-blown fibers differ essentially from other fibers, in particular from those produced by spunbond technique. In the melt blowing process a gas stream of high velocity impinges on the molten polymer stream as the polymer extrudes from small capillary in the melt blowing die and rapidly attenuates the polymer filament from about 500 μm diameter at the capillary down to diameters below 5.0 μm, like down to diameters below 3.0 μm. This corresponds to a reduction of 500 times in fiber diameter and 2,500,000 times in cross sectional area. The process occurs in about 200 microseconds over a distance of a few centimeters. This amounts to 6 times more surface area and 36 times more fiber in a melt blown web of 1 to 3 μm compared to an equivalent fiber web produced by carded or spunbond technique. Thus the principal advantage of the melt blown process is that one can make very fine fibers and very lightweight melt blown webs with excellent uniformity. The result is a soft melt blown web with excellent barrier properties, meaning effective filtration characteristics and resistance to penetration by aqueous liquids. In other words the process features "melt blown" distinguishes such produced fibers from fibers produced by different technology. More precisely "melt blown fibers" are very thin having diameters not accomplished with other fiber processes. Further webs made out of such melt blown fibers are softer and have lower weight compared to webs of the same thickness but produced by other technologies, like the spunbond process.

Accordingly the melt-blown fiber according to the present invention preferably has an (average) diameter measured of equal or below 5.0 μm, more preferably of equal or below 3.0 μm. It is in particular appreciated that the (average) diameter of the melt-blown fiber is in the range of 0.1 to equal or below 5.0 μm, more preferably in the range of 0.3 to 4.9 μm, yet more preferably in the range of 0.4 to equal or below 3.0 μm, like 0.5 to equal or below 3.0 μm.

A further requirement of the present invention is that the melt-blown fiber comprises a terpolymer. Preferably the melt-blown fiber comprises at least 85 wt.-%, more preferably at least 90 wt.-%, like at least 95 wt.-%, of the terpolymer. Accordingly it is in particular appreciated that the melt-blown fiber may comprise in addition to the terpolymer typical additives, like antioxidants stabilizers, fillers, colorants, nucleating agents and mold release agents. Primary and secondary antioxidants include, for example, hindered phenols, hindered amines, and phosphates. Nucleating agents include, for example, sodium benzoate, sorbitol derivatives like bis-(3,4-dimethylbenzylidene)s-orbitol and nonitol derivatives like 1,2,3-trideoxy-4,6:5,7-bis-O[(4-propylphenyl)methylene]-nonitol. Other additives such as dispersing agents like glycerol monostearate can also be included. Slip agents include, for example, oleamide and erucamide. Catalyst deactivators are also commonly used, for example, calcium stearate, hydrotalcite, and calcium oxide, and/or other acid neutralizers known in the art. The amount of such additives however shall preferably not exceed 10 wt.-%, more preferably not more than 5 wt.-%, base on the melt-blown fiber and/or web comprising the melt blown fiber. Accordingly in a specific embodiment the melt-blown fiber and/or the web comprising the melt-blown fiber may contain additives, in particular those as stated in this paragraph, but no other polymers. Thus it is preferred that the terpolymer is the only polymer within the melt-blown fiber and/or web comprising the melt-blown fiber.

In the following the terpolymer is described in more detail.

The term "terpolymer" indicates that the polymer comprises units derived from propylene and from two α-olefins other than propylene. More precisely the terpolymer according to this invention comprises three different units derived from propylene, ethylene and one C4 to C10 α-olefin. In other words the terpolymer of the present invention is a terpolymer of propylene, ethylene and one C4 to C10 α-olefin. Accordingly it is preferred that propylene, ethylene and one $C_4$ to $C_{10}$ α-olefin are the only monomers of the terpolymer. The $C_4$ to $C_{10}$ α-olefin can be any α-olefin, i.e. branched or linear α-olefin, like 1-butene, 1-pentene, 4-methyl-1-pentene, 1-hexene, 1-heptene 1-octene, 1-nonene or 1-decene, however 1-butene or 1-hexene are preferred. In a specific embodiment the terpolymer is a terpolymer of propylene, ethylene and 1-butene only.

Preferably terpolymer has a rather high content of propylene (C3), i.e. at least 90.0 wt.-%, i.e. equal or more than 90.0 wt.-%, more preferably equal or more than 92.0 wt.-%, yet more preferably equal or more than 94.0 wt.-%, like equal or more than 94.5 wt.-%.

Another preferred requirement of the terpolymer is that the amount of ethylene (C2) within the terpolymer is lower compared to the amount of the $C_4$ to $C_{10}$ α-olefin (αO). Accordingly it is appreciated that the weight ratio of ethylene (C2) to the $C_4$ to $C_{10}$ α-olefin (αO) [C2/(αO)] is in the range of 1/100 to below 1/1, more preferably in the range of 1/10 to 1/2, yet more preferably in the range of 1/6 to 1/2.5, like 1/5.5 to 1/2.5.

Accordingly it is preferred that the ethylene (C2) content within the terpolymer is in the range of 0.1 to 3.0 wt.-%, more preferably in the range of 0.5 to 2.8, like in the range of 0.7 to 1.7 wt.-%.

Further it is preferred that the $C_4$ to $C_{10}$ α-olefin (αO), i.e. the 1-butene or 1-hexene, within the terpolymer is in the range of 1.5 to 6.0 wt.-%, more preferably in the range of 2.5 to 5.0, like in the range of 3.5 to 4.5 wt.-%.

It is especially preferred that the terpolymer of propylene (C3), ethylene (C2) and one $C_4$ to $C_{10}$ α-olefin (αO) has a total comonomer content, i.e. a content of ethylene (C2) and the $C_4$ to $C_{10}$ α-olefin (αO) together, in the range of 1.5 to 6.0 wt.-%, preferably of 2.0 to 5.5 wt.-%, more preferably of 2.5 to 5.5 wt.-%.

Further it is appreciated that the xylene cold soluble content (XCS) measured according to ISO 16152 (25° C.) of the terpolymer is not more than 12.0 wt.-%, more preferably of not more than 10.0 wt.-%, yet more preferably of not more than 9.5 wt.-%, like not more than 9.0 wt.-%. Thus a preferred range is 1.0 to 12.0 wt.-%, more preferred 2.0 to 10.0 wt.-%, still more preferred 2.5 to 9.0 wt.-%.

A further characteristic of the terpolymer is that it is produced by a Ziegler-Natta catalyst. Polypropylenes produced by a Ziegler-Natta catalyst are inter alia featured by a rather low amount of missinsertions of propylene within the polymer chain. Accordingly the terpolymer is featured by low amount of <2,1> regiodefects, i.e. of equal or below 0.4 mol.-%, more preferably of equal or below than 0.2 mol.-%, like of equal or below 0.1 mol.-%, determined by $^{13}$C-NMR spectroscopy. In one specific embodiment no <2,1> regiodefects are detectable.

Additionally it is appreciated that the terpolymer has a heat of fusion (Hm) of at least 85 J/g, more preferably of at least 92 J/g, still more preferably in the range of 90 to 110 J/g, yet more preferably in the range of 95 to 105 J/g.

A further feature of the terpolymer is the dependency of the melting temperature on the comonomer content within the terpolymer. It is known that with increase of comonomer the melting temperature decreases. However to obtain the desired properties of the present invention the melting temperature and the comonomer content must comply a specific relationship. Thus it is preferred that the terpolymer according to the instant invention fulfills the equation (1), more preferably the equation (1a), yet more preferably the equation (1b), $$\frac{Tm[°\ C.]}{[°\ C.]} \geq 160 - \frac{\alpha[wt\ \%] \times 5.25}{[wt\ \%]} \tag{1}$$

$$\frac{Tm[°\ C.]}{[°\ C.]} \geq 161 - \frac{\alpha[wt\ \%] \times 5.25}{[wt\ \%]} \tag{1a}$$

$$\frac{Tm[°\ C.]}{[°\ C.]} \geq 162 - \frac{\alpha[wt\ \%] \times 5.25}{[wt\ \%]} \tag{1b}$$

wherein
  Tm [° C.] is the melting temperature [given in ° C.] of said terpolymer measured according to ISO 11357-3,
  α [wt %] is the amount [given in weight percentage] of comonomers, i.e. of ethylene (C2) and the α-olefin (αO) together, within said terpolymer determined $^{13}$C nuclear magnetic resonance spectroscopy ($^{13}$C-NMR).

Further it is appreciated that the terpolymer according to this invention has
  (a) a melting temperature Tm measured according to ISO 11357-3 of least 125° C., preferably at least 130° C., more preferably at least 135° C., i.e. of at least 133° C., yet more preferably in the range of 125 to 155° C., still more preferably in the range of 130 to 152° C.,
and/or
  (b) a crystallization temperature Tc measured according to ISO 11357-3 of equal or below than 115° C., more preferably equal or below 110° C., still more preferably in the range 95 to 115° C., like in the range of 100 to 110° C.

A further mandatory requirement of the terpolymer is its rather high melt flow rate, which differ(s) form other polymers and/or fibers obtained by spunbond technique. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.). Accordingly, it is preferred that in the present invention terpolymer has a melt flow rate $MFR_2$ (230° C.) of at least 300 g/10 min, more preferably of at least 400 g/10 min, still more preferably in the range of in a range of 300 to 3,000 g/10 min, yet more preferably in the range of 400 to 2,000 g/10 min, still yet more preferably in the range of 400 to 1,600 g/10 min, like in the range of 500 to 1,300 g/10 min.

The weight average molecular weight (Mw) is the first moment of a plot of the weight of polymer in each molecular weight range against molecular weight. The weight average molecular weight (Mw) is very sensitive to changes in number of large molecules in a given sample of a polymer. Thus it is preferred that the weight average molecular weight (Mw) measured by SEC according to ISO 16014 of the terpolymer is equal or below 95,000 g/mol, more preferably equal or below 85,000 g/mol, still more preferably equal or below 80,000 g/mol. On the other hand the weight average molecular weight (Mw) of the terpolymer should be not too low. Thus it is especially preferred that the weight average molecular weight (Mw) is in the range of 20,000 g/mol to equal or below 95,000 g/mol, more preferably in the range of 30,000 to equal or below 90,000 g/mol, yet more preferably in the range of 35,000 to equal or below 85,000 g/mol.

Further it is appreciated that the terpolymer has a rather narrow molecular weight distribution (MWD). Accordingly the terpolymer has a molecular weight distribution (MWD) measured by size exclusion chromatography (SEC) according to ISO 16014 of not more than 6.0, more preferably not more than 5.0, yet more preferably not more than 4.5, still more preferably in the range of 2.0 to 6.0, still yet more preferably in the range of 2.2 to 4.5.

A terpolymer with such melt flow rates and molecular weight distributions as discussed above can be obtained by visbreaking or by direct polymerization for instance by using a metallocene catalyst. In the present case the terpolymer has been preferably obtained by visbreaking. Thus it is preferred that the terpolymer before visbreaking has a melt flow rate $MFR_2$ (230° C.) of not more than 120 g/10 min, more preferably in the range of 1 to 100 g/10 min, yet more preferably in the range of 2 to 80 g/10 min. Preferably the initially used terpolymer is chosen in such a manner that the visbreaking ratio [final $MFR_2$ (230° C.)/initial $MFR_2$ (230° C.)] is 100.0 to 300.0, more preferably 180.0 to 250.0, wherein "initial $MFR_2$ (230° C.)" is the $MFR_2$ (230° C.) of the terpolymer before visbreaking and "final $MFR_2$ (230° C.)" is the $MFR_2$ (230° C.) of the terpolymer after visbreaking.

As the melt-blown fiber is dominated by the terpolymer (preferably the terpolymer is the only polymer within the melt blown fiber and melt blown web, respectively) the values concerning comonomer content (as well as comonomer type), xylene cold soluble content (XCS), melt flow rate ($MFR_2$), melting/crystallization behavior, weight average molecular weight (Mw), molecular weight distribution (MWD), and the amount of <2,1> regiodefects are equally applicable also for the melt-blown fiber and melt-blown web, respectively.

The weight per unit area of the melt blown web depend very much on the end use, however it is preferred that the melt blown web has a weight per unit area of at least 15 g/m².

In case the melt-blown web according to the instant invention is produced as a single layer web (e.g. for air filtration purposes) it has a weight per unit area of at least 15 g/m², more preferably of at least 20 g/m², yet more preferably in the range of 25 to 250 g/m², still more preferably in the range of 30 to 200 g/m².

In case the melt-blown web according to the instant invention is produced as one part of a multi-layer construction like an SMS-web comprising, preferably consisting of, a spunbonded web layer, a melt-blown web layer and another spunbonded web layer (e.g. for hygienic application), the melt-blown web has a weight per unit area of at least 1 g/m², more preferably of at least 5 g/m², yet more preferably in the range of 5 to 80 g/m², still more preferably in the range of 5 to 50 g/m².

The present invention is not only directed to the melt-blown fibers as such but also to articles, like webs, made thereof. Accordingly the present invention claims articles selected from the group consisting of filtration medium (filter), diaper, sanitary napkin, panty liner, incontinence product for adults, protective clothing, surgical drape, surgical gown, and surgical wear, comprising a melt-blown web comprising, preferably comprising at least 80 wt.-% of, more preferably comprising at least 95 wt.-% of, yet more preferably consisting of, the melt-blown fibers of the present invention. The present invention is in particular directed to a filtration medium (filter) comprising a melt-blown web comprising, preferably comprising at least 80 wt.-% of, more preferably comprising at least 95 wt.-% of, yet more preferably consisting of, the melt-blown fibers of the present invention.

Further the present invention is directed to the use of the terpolymer according to the present invention for the preparation of a melt-blown fiber, a melt-blown web or an article as defined herein. The present invention is in particular directed to the use of the instant terpolymer to increase the quality factor (QF) of a melt blow web by at least 10% more preferably at least 15%, yet more preferably by at least 20% compared to a melt blown web based on a homopolymer, preferably based on the commercial homopolymer HL512FB of Borealis AG (see example section). The increase is defined by formula (III), more preferably by formula (IIIa), still more preferably by formula (IIIb)

$$10\% = \frac{QF\ (T) - QF\ (H)}{QF\ (H)}, \quad (III)$$

$$15\% = \frac{QF\ (T) - QF\ (H)}{QF\ (H)}, \quad (III)$$

$$20\% = \frac{QF\ (T) - QF\ (H)}{QF\ (H)}, \quad (III)$$

wherein
QF (T) is the quality factor (QF) of the terpolymer
(QF) (H) is the quality factor (QF) of a homopolymer having a melt flow rate of 1,000 to 1,300 g/10 min measured according to ISO 1133 and a melting temperature Tm measured according to ISO 11357-3 of 155 to 160° C., more preferably is the quality factor (QF) of the commercial commercial homopolymer HL512FB of Borealis AG.

The quality factor (QF) is defined in the example section.

In the following the preparation of the melt-blown fiber and web is described in more detail.

The terpolymer as defined in the instant invention may be prepared by polymerizing, in a slurry reactor, for example a loop reactor, propylene (C3) together with ethylene (C2) and/or one $C_4$ to $C_{10}$ α-olefin (αO), in the presence of a polymerization catalyst to produce a part of the terpolymer. This part is then transferred to a subsequent gas phase reactor, whereupon in the gas phase reactor propylene (C3) is reacted in the presence of ethylene (C2) and/or one $C_4$ to $C_{10}$ α-olefin (αO) in order to produce a further part in the presence of the reaction product of the first step. This reaction sequence provides a reactor blend of parts (i) and (ii) constituting the terpolymer. It is of course possible by the present invention that the first reaction is carried out in a gas phase reactor while the second polymerization reaction is carried out in a slurry reactor, for example a loop reactor. It is furthermore also possible to reverse the order of producing parts (i) and (ii), which has been described above in the order of first producing part (i) and then producing part (ii). The above-discussed process, comprising at least two polymerization steps, is advantageous in view of the fact that it provides easily controllable reaction steps enabling the preparation of a desired reactor blend. The polymerization steps may be adjusted, for example by appropriately selecting monomer feed, comonomer feed, hydrogen feed, temperature and pressure in order to suitably adjust the properties of the polymerization products obtained. It is in particular possible to obtain a multimodality, preferably the bimodality, of the terpolymer, with respect to the comonomer distribution as well as with respect to the molecular weights and $MFR_2$ (230° C.) values during said multistage polymerization procedures.

Such a process can be carried out using any suitable catalyst for the preparation of the terpolymer. Preferably, the process as discussed above is carried out using a Ziegler-Natta catalyst, in particular a high yield Ziegler-Natta catalyst (so-called fourth and fifth generation type to differentiate from low yield, so called second generation Ziegler-Natta catalysts). A suitable Ziegler-Natta catalyst to be employed in accordance with the present invention comprises a catalyst component, a co-catalyst component and at least one electron donor (internal and/or external electron donor, preferably at least one external donor). Preferably, the catalyst component is a Ti—Mg-based catalyst component and typically the co-catalyst is an Al-alkyl based compound. Suitable catalysts are in particular disclosed in U.S. Pat. No. 5,234,879, WO 92/19653, WO 92/19658 and WO 99/33843.

Preferred external donors are the known silane-based donors, such as dicyclopentyl dimethoxy silane or cyclohexyl methyldimethoxy silane.

One embodiment of a process as discussed above is a loop-gas phase process, such as developed by Borealis, known as Borstar® technology, described for example in EP 0 887 379 A1 and WO 92/12182.

With respect to the above-mentioned preferred slurry-gas phase process, the following general information can be provided with respect to the process conditions.

Temperature of from 40 to 110° C., preferably between 60 and 100° C., in particular between 80 and 90° C., with a pressure in the range of from 20 to 80 bar, preferably 30 to 60 bar, with the option of adding hydrogen in order to control the molecular weight. The reaction product of the slurry polymerization, which preferably is carried out in a loop reactor, is then transferred to the subsequent gas phase reactor, wherein the temperature preferably is within the range of from 50 to 130° C., more preferably 80 to 100° C., at a pressure in the range of from 5 to 50 bar, preferably 15 to 35 bar, again with the option of adding hydrogen in order to control the molecular weight.

The residence time can vary in the reactor zones identified above. In embodiments, the residence time in the slurry reaction, for example the loop reactor, is in the range of from 0.5 to 5 hours, for example 0.5 to 2 hours, while the residence time in the gas phase reactor generally will be from 1 to 8 hours.

The properties of the terpolymer produced with the above-outlined process may be adjusted and controlled with the process conditions as known to the skilled person, for example by one or more of the following process parameters: temperature, hydrogen feed, comonomer feed, propylene feed, catalyst, type and amount of external donor, split between two or more components of a multimodal polymer.

In case the terpolymer is subjected a visbreaking step, the visbreaking may be carried out in any known manner, like by using a peroxide visbreaking agent. Typical visbreaking agents are 2,5-dimethyl-2,5-bis(tert.butyl-peroxy)hexane (DHBP) (for instance sold under the tradenames Luperox 101 and Trigonox 101), 2,5-dimethyl-2,5-bis(tert.butyl-peroxy)hexyne-3 (DYBP) (for instance sold under the tradenames Luperox 130 and Trigonox 145), dicumyl-peroxide (DCUP) (for instance sold under the tradenames Luperox DC and Perkadox BC), di-tert.butyl-peroxide (DTBP) (for instance sold under the tradenames Trigonox B and Luperox Di), tert.butyl-cumyl-peroxide (BCUP) (for instance sold under the tradenames Trigonox T and Luperox 801) and bis (tert-.butylperoxy-isopropyl)benzene (DIPP) (for instance sold under the tradenames Perkadox 14S and Luperox DC). Suitable amounts of peroxide to be employed in accordance with the present invention are in principle known to the skilled person and can easily be calculated on the basis of the amount of terpolymer to be subjected to visbreaking, the $MFR_2$ (230° C.) value of the terpolymer to be subjected to visbreaking and the desired target $MFR_2$ (230° C.) of the product to be obtained. Accordingly, typical amounts of peroxide visbreaking agent are from 0.005 to 0.5 wt.-%, more preferably from 0.01 to 0.2 wt.-%, based on the amount of terpolymer employed.

Typically, visbreaking in accordance with the present invention is carried out in an extruder, so that under the suitable conditions, an increase of melt flow rate is obtained. During visbreaking, higher molar mass chains of the starting product are broken statistically more frequently than lower molar mass molecules, resulting as indicated above in an overall decrease of the average molecular weight and an increase in melt flow rate.

The thus obtained terpolymer is used in pellet or granule form for the melt-blown fiber process. In the process metering pumps are used to pump the molten terpolymer to a distribution system having a series of die tips, the terpolymer being in the molten state at some processing temperature. The die tip is designed in such a way that the holes are in a straight line with high-velocity air impinging from each side. A typical die will have 0.3 to 0.5 mm diameter, preferably 0.4 mm diameter, holes spaced at 10 to 16 per cm (25 to 40 per inch). The impinging high-velocity hot air attenuates the filaments and forms the desired fibers. Immediately below or adjacent to the die, a large amount of ambient air is drawn into the hot air stream containing the fibers which cools the hot gas and solidifies the fibers onto a forming belt or other solid surface that is typically moving in such a manner as to create a continually renewed surface for the fibers to contact and form a web. The processing temperature is one factor in the final web properties. The "optimal" processing temperature is one at which ideal properties of the web are achieved such as low shot with good hand and high barrier properties, or good filtration properties.

The properties of the melt-blown fiber and/or the melt blown web can be further improved in case the cooling of the fibers is not accomplished with ambient air but by water cooling.

The present invention will now be described in further detail by the examples provided below.

EXAMPLES

1. Definitions/Measuring Methods

The following definitions of terms and determination methods apply for the above general description of the invention as well as to the below examples unless otherwise defined.

Comonomer Content Determination

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 180° C. using nitrogen gas for all pneumatics. Approximately 200 mg of material was packed into a 7 mm outer diameter zirconia MAS rotor and spun at 4.5 kHz. This setup was chosen primarily for the high sensitivity needed for rapid identification and accurate quantification. {klimke06, parkinson07, castignolles09} Standard single-pulse excitation was employed utilising the NOE at short recycle delays{pollard04, klimke06} and the RS-HEPT decoupling scheme {fillip05,griffin07}. A total of 1024 (1 k) transients were acquired per spectra.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm.

Characteristic signals corresponding to regio defects were not observed {resconi00}.

The amount of propene was quantified based on the bulk P1313 methyl sites at 21.9 ppm:

$$P\text{total}=I_{P\beta\beta}$$

Characteristic signals corresponding to the incorporation of 1-butene were observed and the comonomer content quantified in the following way: The amount isolated 1-butene incorporated in PPBPP sequences was quantified using the integral of the αB2 sites at 44.1 ppm accounting for the number of reporting sites per comonomer:

$$B=I_{\alpha B2}/2$$

The amount consecutively incorporated 1-butene in PPBBPP sequences was quantified using the integral of the ααB2 site at 40.5 ppm accounting for the number of reporting sites per comonomer:

$$BB=2*I_{\alpha\alpha B2}$$

The total 1-butene content was calculated based on the sum of isolated and consecutively incorporated 1-butene:

$$B\text{total}=B+BB$$

The mole fraction of 1-butene in the polymer was calculated with respect to all monomers present in the polymer:

$$fB\text{total}=(B\text{total}/(E\text{total}+P\text{total}+B\text{total})$$

Characteristic signals corresponding to the incorporation of ethylene were observed and the comonomer content quantified in the following way: The amount isolated ethylene incorporated in PPEPP sequences was quantified using the integral of the Sαγ sites at 37.9 ppm accounting for the number of reporting sites per comonomer:

$$E=I_{S\alpha\gamma}/2$$

With no sites indicative of consecutive incorporation observed the total ethylene comonomer content was calculated solely on this quantity:

$$E\text{total}=E$$

Characteristic signals corresponding to other forms of ethylene incorporation such as consecutive incorporation were not observed.

The mole percent comonomer incorporation was calculated from the mole fractions:

$$B[\text{mol }\%]=100*fB$$

$$E[\text{mol }\%]=100*fE$$

The weight percent comonomer incorporation was calculated from the mole fractions:

$$B[\text{wt }\%]=100*(fB*56.11)/((fE*28.05)+(fB*56.11)+((1-(fE+fB))*42.08))$$

$$E[\text{wt }\%]=100*(fE*28.05)/((fE*28.05)+(fB*56.11)+((1-(fE+fB))*42.08))$$

CITATIONS klimke06—Klimke, K., Parkinson, M., Piel, C., Kaminsky, W., Spiess, H. W., Wilhelm, M., Macromol. Chem. Phys. 207 (2006) 382 parkinson07—Parkinson, M., Klimke, K., Spiess, H. W., Wilhelm, M., Macromol. Chem. Phys. 208 (2007) 2128 pollard04—Pollard, M., Klimke, K., Graf, R., Spiess, H. W., Wilhelm, M., Sperber, O., Piel, C., Kaminsky, W., Macromolecules 37 (2004) 813 castignolles09—Castignolles, P., Graf, R., Parkinson, M., Wilhelm, M., Gaborieau, M., Polymer 50 (2009) 2373 resconi00—Resconi, L., Cavallo, L., Fait, A., Piemontesi, F., Chem. Rev. 100 (2000) 1253

Melting temperature ($T_m$) and enthalpy ($H_f$), crystallization temperature ($T_c$) and enthalpy ($H_c$): was measured by the DSC method according to ISO 11357-3. For Tm the peak temperature in the second heat in a heat-cool-heat cycle with a rate of 10 K/min between ambient temperature and 210° C. has been used.

Number average molecular weight ($M_n$), weight average molecular weight ($M_w$) and molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

$MFR_2$ (230° C.) is measured according to ISO 1133 (230° C., 2.16 kg load)

The xylene solubles (XCS, wt.-%): Content of xylene cold solubles (XCS) is determined at 25° C. according ISO 16152; first edition; 2005-07-01.

Grammage of the Nonwoven Fabric, the Web, and the Coating Layer

The unit weight (grammage) of the webs in $g/m^2$ was determined in accordance with ISO 536:1995.

Average Fibre Diameter in the Web

The number average fibre diameter was determined using scanning electron microscopy (SEM). A representative part of the web was selected and an SEM micrograph of suitable magnification was recorded, then the diameter of 20 fibres was measured and the number average calculated.

Filtration Efficiency

Air filtration efficiency was determined based on EN 1822-3 for flat sheet filter media, using a test filter area of 400 cm$^2$. The particle retention was tested with an usual aerosol of di-ethyl-hexyl-sebacate (DEHS), calculating efficiency for the fraction with 0.4 μm diameter from a class analysis with 0.1 μm scale. An airflow of 16 m$^3 \cdot$h$^{-1}$ was used, corresponding to an airspeed of 0.11 m·s$^{-1}$.

Quality Factor

The quality factor (QF) is calculated based on formula:

$$QF = \frac{-\ln(1-\eta)}{\Delta p} \times 100$$

in which η is collection efficiency for the particle size of 0.4 μm and Δp is the measured pressure drop in Pa.

B. Examples

Preparation of the Terpolymer:

The commercial terpolymer TD908BF available from Borealis with characteristics as listed in table 1 below has been used as base polymer for visbreaking. This polymer is based on a conventional ZN catalyst and produced in a sequential loop/GPR polymerization plant.

TABLE 1

Properties of terpolymer

| Base Polymer | | T-PP |
|---|---|---|
| MFR$_2$ | [g/10 min] | 4 |
| C2 | [wt.-%] | 0.6 |
| C4 | [wt.-%] | 4.7 |
| Tm | [° C.] | 148 |
| ΔH$_f$ | [J/g] | 98 |
| Tc | [° C.] | 106 |
| ΔH$_c$ | [J/g] | 83 |
| <2,1> | [mol.-%] | 0 |

C2 is ethylene content
C4 is 1-butene content
<2,1> are the <2,1> regiodefects

TABLE 2 visbroken polymers

| Base Polymer | | H-PP | T-PP |
|---|---|---|---|
| MFR$_2$ | [g/10 min] | 1,200 | 770 |
| M$_w$ | [kg/mol] | 65 | 68 |
| MWD | [—] | 3.1 | 2.8 |
| XCS | [wt.-%] | 3.2 | 4.1 |
| C2 | [wt.-%] | 0 | 0.6 |
| C4 | [wt.-%] | 0 | 4.7 |
| Tm | [° C.] | 157 | 148 |
| ΔH$_f$ | [J/g] | 110 | 98 |
| Tc | [° C.] | 115 | 106 |
| ΔH$_c$ | [J/g] | 107 | 83 |
| <2,1> | [mol.-%] | 0 | 0 |

C2 is ethylene content
C4 is 1-butene content
<2,1> are the <2,1> regiodefects
H-PP is the commercial propylene homopolymer HL512FB of Borealis AG The polymers were tested on the Reicofil melt blown pilot line using a die with holes of 0.4 mm diameter and 35 holes per inch.

TABLE 3

Applied process conditions for best QF values

| | | H-PP | T-PP |
|---|---|---|---|
| DCD | [mm] | 350 | 350 |
| Basic weight | [g/m$^2$] | 60 | 60 |
| throughput | [kg/h/m] | 5 | 5 |
| T$_{PE}$ | [° C.] | 270 | 300 |
| T$_{air}$ | [° C.] | 300 | 270 |
| QF | [—] | 0.477 | 0.573 |
| air max | [m$^3$/h] | 480 | 130 |

DCD is the die-to-collector distance
T$_{PE}$ is the polymer melt temperature in the extruder
T$_{air}$ is the processing air temperature
QF is the quality factor (QF)

TABLE 4

Applied process conditions for best efficiency values

| | | H-PP | T-PP |
|---|---|---|---|
| DCD | [mm] | 350 | 350 |
| Basic weight | [g/m$^2$] | 60 | 60 |
| throughput | [kg/h/m] | 5 | 5 |
| T$_{PE}$ | [° C.] | 300 | 300 |
| T$_{air}$ | [° C.] | 270 | 270 |
| FE | [—] | 88.4 | 97.9 |
| air max | [m$^3$/h] | 380 | 130 |

DCD is the die-to-collector distance
T$_{PE}$ is the polymer melt temperature in the extruder
T$_{air}$ is the processing air temperature
FE is the filtration efficiency

We claim:

1. Melt-blown fiber comprising a terpolymer of propylene (C3), ethylene (C2) and a C$_4$ to C$_{10}$ α-olefin (αO), wherein further
    (a) said melt blown fiber and/or said terpolymer has/have a melt flow rate MFR$_2$ (230° C.) measured according to ISO 1133 of at least 300 g/10 min,
    (b) the amount of propylene (C3) in said terpolymer is at least 90.0 wt.-%,
    (c) the weight ratio of ethylene to C$_4$ to C$_{10}$ α-olefin [C2/αO] within said terpolymer is 1/100 to below 1/1, and
    (d) the terpolymer has <2,1> regiodefects of below 0.4 mol.-% determined by $^{13}$C-spectroscopy.

2. Melt-blown fiber according to claim 1, wherein the melt-blown fiber has an average diameter of equal or below than 5.0 μm.

3. Melt-blown fiber according to claim 1, wherein
    (a) the amount of ethylene (C2) of said terpolymer is in the range of 0.1 to 3.0 wt.-%,
    and/or
    (b) the amount of α-olefin (αO) of said terpolymer is in the range of 1.5 to 6.0 wt.-%.

4. Melt-blown fiber according to claim 1, wherein said melt blown fiber and/or said terpolymer fulfill(s) the equation (1)

$$\frac{Tm[° \text{ C.}]}{[° \text{ C.}]} \geq 160 - \frac{\alpha[\text{wt \%}] \times 5.25}{[\text{wt \%}]} \quad (1)$$

wherein
- Tm [° C.] is the melting temperature [given in ° C.] of said melt blown fiber and/or of said terpolymer measured according to ISO 11357-3,
- α [wt %] is the amount [given in weight percentage] of comonomers, i.e. of ethylene (C2) and the α-olefin (αO) together, within said melt blown fiber and/or within said terpolymer determined $^{13}$C nuclear magnetic resonance spectroscopy ($^{13}$C-NMR).

5. Melt-blown fiber according to claim 1, wherein the melt-blown fiber and/or the terpolymer has/have
   (a) a weight average molecular weight (Mw) of equal or below 95,000 g/mol,
   and/or
   (b) a molecular weight distribution ($M_w/M_n$) of 2.0 to 6.0 measured by size exclusion chromatography (SEC) according to ISO 16014.

6. Melt-blown fiber according to claim 1, wherein the melt-blown fiber and/or the terpolymer has/have a xylene cold soluble fraction (XCS) measured according to ISO 16152 (25° C.) in the range of 1.0 to 12.0 wt.-%.

7. Melt-blown fiber according to claim 1, wherein the melt-blown fiber and/or the terpolymer has/have
   (a) melting temperature Tm in the range of 125 to 155° C.,
   and/or
   (b) a crystallization temperature Tc of equal or below than 115° C.
   measured according ISO 11357-3.

8. Melt-blown fiber according to claim 1, wherein the terpolymer is vis-broken.

9. Melt-blown fiber according to claim 1, wherein
   (a) the terpolymer is the only polymer within the melt-blown fiber,
   and/or
   (b) the melt-blown fiber comprises at least 85 wt.-% of the terpolymer.

10. Melt-blown web comprising melt-blown fibers according to claim 1.

11. Melt-blown web according to claim 10 having a weight per unit area of at least 15 g/m².

12. Article comprising a melt-blown fiber according to claim 1, said article is selected from the group consisting of filtration medium, diaper, sanitary napkin, panty liner, incontinence product for adults, protective clothing, surgical drape, surgical gown, and surgical wear.

13. Process for the preparation of a melt-blown fibers comprising steps of:

providing a terpolymer of propylene (C3), ethylene (C2) and a $C_4$ to $C_{10}$ α-olefin (αO), wherein further
   (a) said melt blown fiber and/or said terpolymer has/have a melt flow rate $MFR_2$ (230° C.) measured according to ISO 1133 of at least 300 g/10 min,
   (b) the amount of propylene (C3) in said terpolymer is at least 90.0 wt.-%,
   (c) the weight ratio of ethylene to $C_4$ to $C_{10}$ α-olefin [C2/αO] within said terpolymer is 1/100 to below 1/1, and
   (d) the terpolymer has <2,1> regiodefects of below 0.4 mol.-% determined by $^{13}$C-spectroscopy
melt blowing said terpolymer by using a melt blown plant having a die with holes of 0.3 to 0.5 mm diameter and 10 to 16 holes per cm.

14. Use of a terpolymer as defined in claim 1 for the preparation of a melt-blown fiber
   producing a melt-blown web comprising melt-blown fibers, said melt-blown fibers having a weight per unit area of at least 15 g/m².

15. Use of a terpolymer as defined in claim 1 to increase the quality factor (QF) of a melt blown web by at least 10%, wherein the increase is defined by formula (III)

$$10\% = \frac{QF\ (T) - QF\ (H)}{QF\ (H)}, \qquad (III)$$

wherein
   QF (T) is the quality factor (QF) of the terpolymer, and
   (QF) (H) is the quality factor (QF) of a homopolymer having a melt flow rate $MFR_2$ (230° C.) measured according to ISO 1133 of 1,000 to 1,300 g/10 min and a melting temperature ($T_m$) measured according to ISO 11357-3 of 155 to 160° C.,
   producing a melt blown web and increasing the quality factor (QF) of the melt blown web by at least 10%.

16. Article comprising a melt-blown web according to claim 10, said article selected from the group consisting of filtration medium, diaper, sanitary napkin, panty liner, incontinence product for adults, protective clothing, surgical drape, surgical gown, and surgical wear.

17. Article comprising a melt-blown web according to claim 10, said melt-blown fiber having a weight per unit area of at least 15 g/m² and said article selected from the group consisting of filtration medium, diaper, sanitary napkin, panty liner, incontinence product for adults, protective clothing, surgical drape, surgical gown, and surgical wear.

* * * * *